Jan. 11, 1949.  H. D. HARTOUGH ET AL  2,458,513
PROCESS FOR THE ACYLATION OF THIOPHENE
Filed March 9, 1946
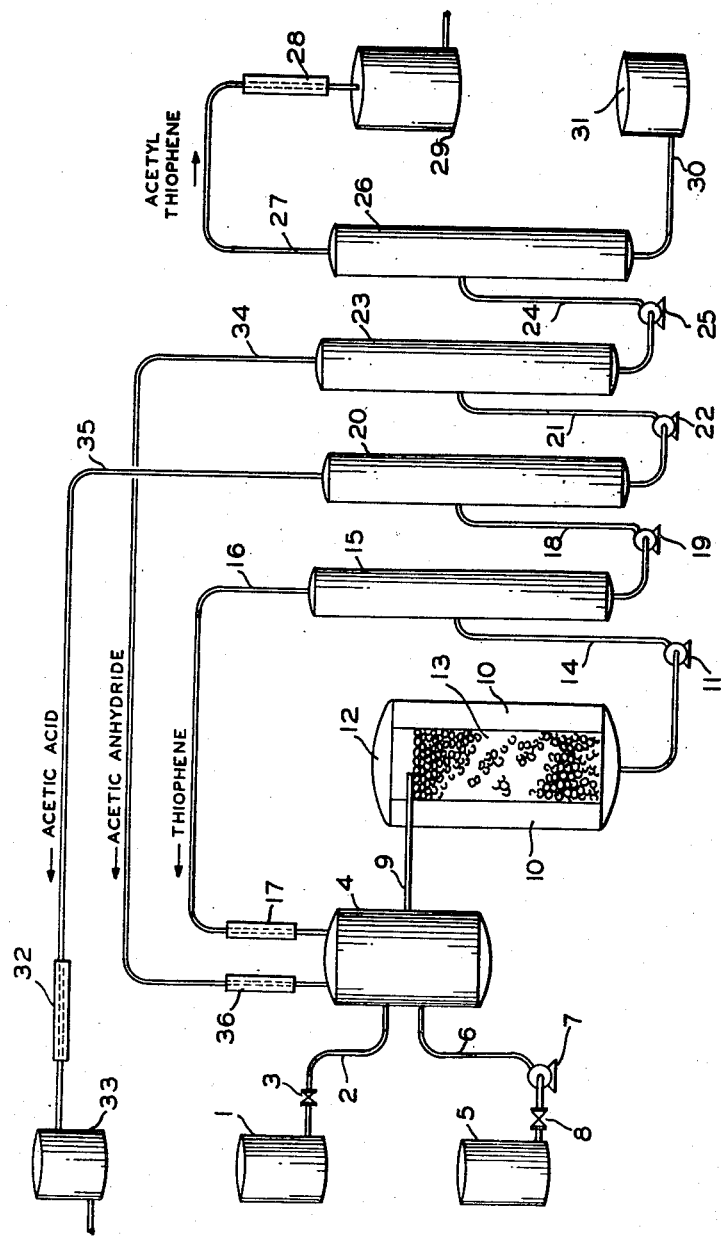
HOWARD D. HARTOUGH
ALVIN I. KOSAK
INVENTORS
BY Raymond W. Barclay
AGENT Patented Jan. 11, 1949

2,458,513

UNITED STATES PATENT OFFICE 2,458,513

PROCESS FOR THE ACYLATION OF THIOPHENE

Howard D. Hartough, Pitman, N. J., and Alvin I. Kosak, Columbus, Ohio, assignors to Socony-Vacuum Oil Company, Incorporated, a corporation of New York Application March 9, 1946, Serial No. 653,419

20 Claims. (Cl. 260—329)

This invention relates to a catalytic process for the acylation of thiophenes and, more particularly, is directed to a continuous method for the acylation of thiophene and its derivatives in the presence of a porous absorptive material impregnated with an acidic catalyst comprising a hydroxy acid of sulfur, phosphorus or fluorine.

Acylation reactions connoting the union between acyl radicals and molecules of organic compounds are well known in the art. The compounds thus produced represent structurally the substitution of an acyl radical on the organic compound molecule with the elimination of a hydrogen atom. The acyl radical may be furnished by various materials commonly referred to as acylating agents. Thus, organic acid anhydrides, acyl halides and acyl nitriles have served as sources of the acyl radical. In particular, acetyl chloride and acetic anhydride have found wide application as acylating agents.

Heretofore, the usual method for producing acylated thiophenes involved the reaction of one of the above-mentioned acylating agents with a thiophene in the presence of aluminum chloride as catalyst. Other catalysts which have been used include stannic chloride and titanium tetrachloride. These catalysts, although applicable with considerable success in the acylation of aromatic hydrocarbons, are only moderately successful where thiophene is involved. This appears to be due to the relative instability of the thiophene ring, the catalyst, for example aluminum chloride, attacking the ring at the sulfur linkages and causing many undesirable secondary products with resultant low yields of acyl thiophene. These previously employed processes, moreover, have the disadvantage that they must be carried out in batch-type operation because the ketone produced forms an addition compound with the aluminum chloride catalyst, which must subsequently be decomposed by hydrolysis to obtain the desired ketone. Thus, for each molecular proportion of ketone obtained, one molecular proportion of aluminum chloride catalyst was consumed. With the increased use and demand in industry for acylated thiophenes, the need has arisen for a more efficient continuous process of manufacture. The process of the present invention contemplates fulfillment of this need. In accordance therewith, it has been found that thiophenes may be acylated by passage of the thiophene or thiophene derivative and acylating agent over a catalyst comprising a porous absorptive material impregnated with a sulfur, phosphorus, or fluorine-containing hydroxy acid. It has been discovered that by using said catalysts the acylation process may be effectively carried out in a continuous manner. In addition to effecting a smooth, continuous acylation process, it has been found that by employing the above catalyst, undue formation of addition complexes, formerly encountered in the catalytic acylation of thiophene, have been substantially eliminated, the products resulting being almost entirely acyl thiophenes having one or more side chains corresponding to that of the acylating agent.

The porous absorptive materials used herein may be either natural or synthetic adsorbents. Thus, porous clays, zeolites, charcoal, inorganic oxide gels and synthetic composites of hydrous metallic oxides have been employed as porous materials for the present invention. These materials are impregnated with a strong hydroxy acid containing phosphorus, sulfur, or fluorine. Representative of the acids which may be used herein are strong hydroxy acids of phosphorus, such as phosphoric and phosphorous acids; strong hydroxy acids of sulfur, such as sulfuric and the sulfonic acids, including the organic sulfonic acids; strong hydroxy acids containing fluorine, such as fluosulfonic, dihydroxy fluoboric and fluophosphoric acid. Other hydroxy acids of fluorine, sulfur, or phosphorus, having relatively high dissociation constants, that is, generally greater than $1.0 \times 10^{-2}$ for the first hydrogen atom are likewise contemplated for use as catalysts in the acylation of thiophene and its derivatives. Hence, the above representative list of suitable acids is not to be considered as limiting.

Particularly adaptable for the porous absorptive material used herein are silica-inorganic oxide composites. Thus, naturally occurring silica-alumina clays of the montmorillonite type which have been activated have been found to be effective porous materials for acid impregnation. Typical of such products is the material sold under the name of Super Filtrol. Other clays contemplated for use in the present process include fuller's earth and Attapulgus clay. In addition to the natural porous silica-alumina materials, synthetic silica-metallic oxide catalysts may be used. These materials are synthetic porous absorptive composites comprising silica and one or more hydrous metallic oxides, such as alumina, zirconia, hematite, and thoria. These materials may be formed in various ways as, for example, precipitating silica on alumina, or alumina on silica, or by combining a silica gel with alumina, or by preparing a silica-alumina gel. The synthetic or naturally occurring porous materials are employed in the process of this invention, usually in the form of pellets, spheroidal particles, and irregularly shaped pieces of a size corresponding to from about 6 to about 12 mesh.

The acylating agents to be used herein may be an organic carboxylic acid anhydride or acyl halide. Included in the former category are compounds such as the ketenes, having the basic structure

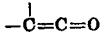

and which, upon the addition of water, yield organic carboxylic acids. These may be derived by methods well known to the art from organic acids which may be either saturated or unsaturated. Thus, representative acylating agents to be used in this invention include the anhydrides of saturated fatty acids, such as acetic anhydride, propionic anhydride, ketene, etc.; the acyl halides of saturated fatty acids, such as acetyl chloride; the anhydrides of unsaturated acids, such as crotonic anhydride; and the acyl halides of unsaturated acids, such as crotonyl chloride. These acylating agents are given merely by way of example and are not to be construed as limited since other acyl halides or anhydrides of carboxylic acids, which will readily suggest themselves to those skilled in the art may likewise be used.

Thiophene or derivatives of thiophene having one or more substituent groups, such as halogen, alkyl, aryl, or alkoxy groups attached to the thiophene ring may be acylated in accordance with this invention. The acylation of thiophene or its derivatives may be carried out employing equimolar quantities of thiophene and acylating agent. However, an excess of thiophene appears to be desirable, giving rise, in general, to an increased yield of desired ketone.

The reaction rate is largely a function of temperature increasing with increasing temperatures, the upper limit of temperature being dependent on the boiling point of the reactants at the specific pressure of the reaction. In general, temperatures from about 0° to about 150° C. have been found satisfactory for effecting the acylation reaction. At temperatures less than the lower limit stated, the reaction is too slow to be practical, while at temperatures greater than 150° C. charring occurs. It will be understood by those skilled in the art that when the boiling point of the acylation mixture employed is lower than the reaction temperature chosen, pressure will be applied to the reaction system sufficient to maintain all components in their liquid state.

Intimate contact of the reacting components with the catalyst is effective in a continuous type of operation by passing the reaction mixture through a fixed bed of porous absorptive material impregnated with one of the above-mentioned acids or the reacting components may be mixed with finely divided catalyst in a substantially fluid type of operation. Batch-type reaction may be carried out by mixing the reactants and catalysts in a closed vessel provided with adequate means of agitation, after which the products may be removed therefrom and separated. However, the process of this invention is particularly adaptable for continuous type operation and such operation may be effected by passing the reactants through a bed of the catalyst at a rate of flow varying between about 0.5 and about 5 volumes of liquid per volume of catalyst per hour. The desired ketone is separated from the unreacted thiophene by suitable means, such as distillation, and the unreacted portion of the thiophene is returned through the process and mixed with an additional quantity of acylating agent and thiophene being charged to contact with the catalyst.

The catalyst to be employed herein may be prepared by soaking in or otherwise impregnating the particles with the acid to be used. An essential feature of the acid employed is that it be a strong hydroxy acid of phosphorus, sulfur, or fluorine. Strong hydroxy acids not containing one of these elements, such as picric acid, and weak hydroxy acids, such as boric acid, did not exhibit any catalytic activity when deposited on the porous material used. Likewise, strong inorganic acids which do not contain hydroxy groups, such as hydrochloric, hydrofluoric, and hydrobromic acids, were also devoid of any catalytic effect. The chemistry of thiophene in many respects is similar to that of benzene. However, it is to be noted that the catalysts of the present invention are inoperative as catalysts for the acylation of benzene.

The porous material used may be itself either inert in promoting the acylation of thiophene, such as silica gels and coconut charcoal, or the porous material may itself exert some catalytic effect in promoting the acylation reaction. Included in the latter category are the activated silica-alumina clays and synthetic composites of silica and a hydrous metallic oxide, such as alumina, zirconia, hematite, or thoria.

The process of this invention accordingly comprises passing a mixture of thiophene or thiophene derivative and acylating agent through a catalyst comprising a porous absorptive material impregnated with a strong hydroxy acid of phosphorus, sulfur, or fluorine, maintaining the reactants in contact with said catalyst at a suitable temperature for a sufficient period of time to effect the acylation of thiophene or thiophene derivative, collecting the product ensuing from said catalytic bed and distilling to give the desired acylated thiophene. Unreacted thiophene is recovered and reused by again passing it through the bed of porous catalyst.

A suitable system for carrying out the continuous acylation of thiophene, in accordance with the present invention, is shown in the attached drawing. While the flow diagram indicated is directed particularly to the acetylation of thiophene with acetic anhydride, those skilled in the art will understand that a system similar to that shown could likewise be employed, with minor alterations, when other carboxylic acid anhydrides or acyl halides are used as the acylating agent.

Referring more particularly to the drawing, thiophene is continuously conducted from storage tank 1 through conduit 2 to mixing chamber 4, the rate of flow being controlled by valve 3. In a similar manner, acetic anhydride is continuously lead from storage tank 5 and forced through conduit 6 by pump 7, the flow rate being controlled by valve 8. The reactants in the desired proportion are thoroughly mixed in chamber 4 and then conducted through pipe 9 to reactor 12, suitably packed with catalyst pellets 13. The reaction vessel is surrounded by a heating coil 10, which can be regulated so as to control the temperature within the reactor. The resultant reaction product mixture of acetylthiophene, acetic acid, any excess acetic anhydride, and any excess thiophene passes from the lower portion of reactor through conduit 14 and is forced by means of pump 11 to fractionating tower 15. Thiophene, being the lowest boiling component of the mixture, is removed as vapor from the upper portion of the tower through pipe 16, passes through condenser 17 and enters the mixing chamber 4 as a liquid, where it serves to augment the supp'y of thiophene being conducted from tank 1.

The remaining components of the reaction mixture, namely, acetic acid, acetic anhydride and acetylthiophene, condense in the bottom of tower 15. They are conducted therefrom and forced through conduit 18 by pump 19 to a second fractionating tower 20, where acetic acid is removed as vapor from the top of the tower, passing through pipe 35 and condenser 32 to storage tank 33.

The condensed mixture of acetylthiophene and acetic anhydride is removed from the bottom of tower 20 and forced through conduit 21 by pump 22 to a third fractionating tower 23. Acetic anhydride is there removed as a vapor, passing through pipe 34 and condenser 36 to mixing chamber 4, where it serves to augment the supply of acetic anhydride being conducted from tank 5.

Crude acetylthiophene passes from the bottom of tower 23 and is forced through conduit 24 by pump 25 to fractionator 26, where it is distilled under reduced pressure. Acetylthiophene vapor passes from the top of 26 through pipe 27 and is condensed upon passing through condenser 28 and enters storage tank 29 as a liquid. A small amount of resinous tar accumulating in the bottom of fractionator 26 is removed through pipe 30 and is collected in receiver 31.

Acylated thiophenes produced in accordance with this invention are useful as solvents, dye intermediates, addition compounds for petroleum fractions, plasticizers, odorants, perfume diluents, resin intermediates, and intermediates for chemical synthesis. Long chain alkyl thienyl ketones may also find uses as synthetic lubricants, waxes, extreme pressure additives for mineral oils and anti-foaming agents.

The following detailed examples are for the purpose of illustrating modes of effecting the acylation of thiophene in accordance with the process of this invention. It is to be clearly understood that this invention is not to be considered as limited to the specific acylating agents disclosed hereinafter or to the specific conditions set forth in the examples.

*Example 1*

Into a reactor surrounded by a heating medium were placed 100 grams of silica gel impregnated with 30 per cent by weight of phosphoric acid. The reactor was maintained at 50° C. and 125 milliliters of a solution composed of 84 grams (1 mole) of thiophene and 110 grams (1.1 moles) of 95 per cent acetic anhydride were introduced into the reactor. The rate of flow was such that the reaction mixture remained in contact with the catalyst for 1 hour, the mixture then being drawn off from the lower portion of the reactor at a uniform rate. The remainder of the starting material was continuously added to the reactor. At the end of 2 hours all of the reactant mixture had passed through the catalyst bed and upon distillation of the resultant product mixture, a 30 per cent conversion of 2-acetylthiophene was obtained.

*Example 2*

A charge consisting of 1 mole of thiophene and 1 mole of 95 per cent acetic anhydride was passed over 100 grams of silica gel impregnated with 30 per cent by weight of phosphoric acid maintained at a temperature of 70° C. The reaction product was treated as in Example 1 and a 42 per cent conversion to 2-acetylthiophene was obtained.

*Example 3*

One mole of thiophene and 1 mole of propionic anhydride were mixed and passed over 100 grams of silica gel impregnated with 30 per cent by weight of phosphoric acid maintained at a temperature of 70° C. The rate of flow was such that the reaction mixture remained in contact with the catalyst for 1 hour, the mixture being drawn off at a uniform rate and the remainder of the starting material continuously added to the reactor over a period of 1.75 hours. The product was then neutralized with sodium carbonate solution and distilled. A 44 per cent conversion to 2-propionylthiophene was obtained.

*Example 4*

A charge of 1 mole of thiophene and 1.1 moles of 95 per cent acetic anhydride was passed over a catalyst consisting of 6–12 mesh coconut charcoal particles impregnated with 30 per cent by weight of sulfuric acid. The reaction mixture was treated as in Example 1 and a conversion of 22 per cent to 2-acetylthiophene was obtained.

*Example 5*

A charge of 1 mole of thiophene and 1 mole of acetic anhydride was passed over a catalyst consisting of a synthetic silica-alumina material impregnated with 30 per cent by weight of phosphoric acid. The reaction mixture was maintained at a temperature of 70° C. and the time for a single pass was 170 minutes. At the end of this time all liquid had passed through the catalyst bed and into a reactor where it was neutralized with sodium carbonate solution and distilled. A 53 per cent conversion to 2-acetylthiophene was obtained.

The catalyst was reacted several times in this fashion and the percentage conversion to 2-acetylthiophene per pass remained substantially unchanged, as shown by the data below:

| | Temp., °C. | Total Time of Run In Minutes | Percent Conversion to 2-acetylthiophene per pass |
|---|---|---|---|
| A. Original catalyst | 70 | 170 | 53 |
| B. Catalyst from A | 70 | 170 | 66 |
| C. Catalyst from B | 70 | 170 | 54 |
| D. Catalyst from C | 70 | 170 | 63 |
| E. Catalyst from D | 70 | 170 | 50 |
| F. Catalyst from E | 70 | 170 | 52 |

*Example 6*

A charge consisting of 3 moles of thiophene and 1 mole of acetic anhydride was passed over a porous synthetic silica-alumina material impregnated with 30 per cent by weight of phosphoric acid. Temperature was maintained at 70° C. and the time for a single pass was 170 minutes. At the end of this period, all the reactant mixture had passed through the catalyst bed and into a receiver where it was neutralized and distilled.

An 80 per cent conversion to 2-acetylthiophene was obtained.

Example 7

A charge consisting of 1 mole of thiophene and 1 mole of acetic anhydride was passed over a porous synthetic silica-alumina material impregnated with 30 per cent by weight of sulfuric acid. The temperature was maintained at 70° C. and the time for a single pass was 15 minutes. At the end of this period all of the reactant mixture had passed through the catalyst bed and was collected in a receiver, neutralized and distilled to give a percentage conversion to 2-acetylthiophene of 64 per cent.

Example 8

A charge consisting of 1 mole of thiophene and 1 mole of acetic anhydride was passed over a silica-alumina hydrogel catalyst impregnated with 30 per cent by weight of phosphoric acid. The temperature of the reaction mixture was maintained at 70° C. and the time for a single pass was 170 minutes. The resulting product was collected, neutralized and distilled as any preceding examples and a 47 per cent conversion to 2-acetylthiophene was obtained.

The catalyst was reacted several times in this fashion and the percentage conversion to 2-acetylthiophene per pass remained substantially unchanged, as shown by the data below:

|  | Temp., °C. | Total Time of Run in Minutes | Per cent Conversion to 2-acetylthiophene per pass |
|---|---|---|---|
| A. Original catalyst | 70 | 170 | 47 |
| B. Catalyst from A | 70 | 170 | 51 |
| C. Catalyst from B | 70 | 170 | 44 |

Example 9

A charge consisting of 1 mole of thiophene and 1 mole of acetic anhydride was passed over a porous synthetic silica-zirconia gel impregnated with dihydroxy fluoboric acid. Temperature was maintained at 25° C. and the rate of flow was such that the reaction mixture remained in contact with the catalyst for 1 hour. The reaction product was treated as in Example 1 and a 17 per cent conversion to 2-acetylthiophene was obtained.

The following examples were run employing a 3:1 molar ratio of thiophene to acetic anhydride and passing the resultant reaction mixture over approximately 2500 cubic centimeters of a synthetic silica-alumina composite impregnated with 30 per cent phosphoric acid. The pressure was maintained at 50 pounds per square inch. Further reaction conditions and percentage conversion to acetylthiophene are summarized in the table below:

| Example | Residence Time in Hours | Temp., °C. | Weight Per Cent Acetic Anhydride in Charge | Weight Per Cent Acetic Anhydride Consumed | Weight Per Cent Ultimate Conversion of Thiophene to Acetylthiophene |
|---|---|---|---|---|---|
| 10 | 0.45 | 70 | 29.7 | 75.6 | 99 |
| 11 | 0.45 | 70 | 30.0 | 68.0 | 99 |
| 12 | 1.0 | 70 | 29.5 | 67.0 | 98 |
| 13 | 1.0 | 85 | 29.5 | 81.0 | 95 |
| 14 | 1.0 | 100 | 29.5 | 86.0 | 94 |
| 15 | 1.0 | 115 | 29.5 | 91.2 | 98 |
| 16 | 1.0 | 130 | 29.5 | 96.0 | 99 |
| 17 | 1.0 | 146 | 29.5 | 98.6 | 96 |
| 18 | 0.5 | 100 | 29.5 | 75.6 | 99 |
| 19 | 7.0 | 100 | 29.5 | 87.4 | 99 |
| 20 | 1.0 | 100 | 29.5 | 74.0 | 97 |

From the above examples it will be apparent that porous absorptive materials impregnated with a strong hydroxy acid of fluorine, phosphorus, or sulfur are successful catalysts for promoting the continuous acylation of thiophene. The porous absorptive material used may be either synthetic or naturally occurring. While the present invention, of course, is not to be limited by any theory it would appear that the acids used herein should necessarily contain at least one hydroxy group in their structure and in addition one or more of the elements fluorine, phosphorus, or sulfur. Thus, hydroxy-containing acids, such as boric and picric acids, in which the above elements are absent, were not found to exert any catalytic action in promoting the acylation reaction. Likewise, strong acids containing no hydroxy groups were found to be ineffective as catalysts. The terms and description set forth above, however, are not to be construed as limiting the invention except as hereinafter defined by the appended claims.

We claim:

1. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a porous absorptive material impregnated with a strong hydroxy acid having an initial ionization constant greater than about $1.0 \times 10^{-2}$ and containing at least one element selected from the group consisting of sulfur, phosphorus, and fluorine.

2. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a porous absorptive material impregnated with a strong hydroxy acid of phosphorus having an initial ionization constant greater than about $1.0 \times 10^{-2}$.

3. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a porous absorptive material impregnated with a strong hydroxy acid of sulfur having an initial ionization constant greater than about $1.0 \times 10^{-2}$.

4. A process for nuclear acylation of an acylatable thiophene compound to yield a product having an acyl radical attached to the thiophene nucleus of said compound, which comprises reacting an acylatable thiophene compound with an acylating agent selected from the group consisting of acyl halides and carboxylic acid anhydrides in the presence of a porous absorptive material impregnated with a strong hydroxy fluorine containing acid having an initial ionization constant greater than about $1.0 \times 10^{-2}$.

5. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with a hydroxy acid having an initial ionization constant greater than about $1.0 \times 10^{-2}$ and containing at least one element selected from the group consisting of sulfur, phosphorus, and fluorine, collecting the reaction product ensuing from said bed and removing therefrom an acylated thiophene.

6. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive silica-metal oxide material impregnated with a hydroxy acid having an initial ionization constant greater than about $1.0 \times 10^{-2}$ and containing at least one element selected from the group consisting of sulfur, phosphorus, and fluorine, collecting the reaction product ensuing from said bed and removing therefrom an acylated thiophene.

7. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of an inert porous absorptive material impregnated with a hydroxy acid having an initial ionization constant greater than about $1.0 \times 10^{-2}$ and containing at least one element selected from the group consisting of sulfur, phosphorus, and fluorine, collecting the reaction product ensuing from said bed and removing therefrom an acylated thiophene.

8. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive activated silica-alumina material impregnated with a hydroxy acid having an initial ionization constant greater than about $1.0 \times 10^{-2}$ and containing at least one element selected from the group consisting of sulfur, phosphorus, and fluorine, collecting the reaction product ensuing for said bed and removing therefrom an acylated thiophene.

9. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with orthophosphoric acid, collecting the reaction product ensuing from said bed and removing therefrom an acylated thiophene.

10. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with sulfuric acid, collecting the reaction product ensuing from said bed and removing therefrom an acylated thiophene.

11. A continuous process for the nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with dihydroxy fluoboric acid, collecting the reaction product ensuing from said bed and removing therefrom an acylated thiophene.

12. A continuous process for the acylation of thiophene, comprising passing a reaction mixture of thiophene and an acylating agent selected from the group consisting of acyl halides and carboxylic acid anhydrides through a bed of porous absorptive material impregnated with orthophosphoric acid, collecting the reaction product ensuing from said bed and removing therefrom an acylated thiophene.

13. A continuous process for the acylation of thiophene, comprising passing a reaction mixture of thiophene and an acylating agent selected from the group consisting of acyl halides and carboxylic acid anhydrides through a bed of porous absorptive material impregnated with sulfuric acid, collecting the reaction product ensuing from said bed and removing therefrom an acylated thiophene.

14. A continuous process for the acylation of thiophene, comprising passing a reaction mixture of thiophene and an acylating agent selected from the group consisting of acyl halides and carboxylic acid anhydrides through a bed of porous absorptive material impregnated with dihydroxy fluoboric acid, collecting the reaction product ensuing from said bed and removing therefrom an acylated thiophene.

15. A continuous process for the acylation of thiophene, comprising passing a reaction mixture of thiophene and an acylating agent selected from the group consisting of acyl halides and carboxylic acid anhydrides through a bed of porous absorptive activated silica-alumina material impregnated with orthophosphoric acid, collecting the reaction product ensuing from said bed and removing therefrom an acylated thiophene.

16. A continuous process for the acylation of thiophene, comprising passing a reaction mixture of thiophene and an acylating agent selected from the group consisting of acyl halides and carboxylic acid anhydrides through a bed of porous absorptive activated silica-alumina material impregnated with sulfuric acid, collecting the reaction product ensuing from said bed and removing therefrom an acylated thiophene.

17. A continuous process for nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with a hydroxy acid having an initial ionization constant greater than about $1.0 \times 10^{-2}$ and containing at least one element selected from the group consisting of sulphur, phosphorus, and fluorine at a temperature between about 0° C. and about 150° C., collecting the reaction product ensuing from said bed, neutralizing the same and distilling to give an acylated thiophene.

18. A continuous process for nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with orthophosphoric acid at a temperature from about 0° C. to about 150° C., collecting the reaction product ensuing from said bed, neutralizing the same and distilling to give an acylated thiophene.

19. A continuous process for nuclear acylation of an acylatable thiophene compound to yield a product having an acyl radical attached to the thiophene nucleus of said compound, which comprises passing a reaction mixture of an acylatable thiophene and an acylating agent selected from the group consisting of acyl halides and carboxylic acid anhydrides through a bed of porous absorptive material impregnated with sulfuric acid at a temperature from about 0° C. to about 150° C., collecting the reaction product ensuing from said bed, neutralizing the same and distilling to give an acylated thiophene.

20. A continuous process for acylating thiophene, which comprises passing a reaction mixture of thiophene and an acylating agent selected from the group consisting of acyl halides and carboxylic acid anhydrides through a catalyst bed of porous absorptive material impregnated with a hydroxy acid having an initial ionization constant greater than about $1.0 \times 10^{-2}$ and containing at least one element selected from the group consisting of sulfur, phosphorus, and fluorine at a rate of flow between about 0.5 and about 5 volumes of liquid reaction mixture per volume of catalyst per hour at a temperature between about 0° C. and about 150° C., collecting the reaction product ensuing from said bed, neutralizing the same and distilling to give an acylated thiophene.

HOWARD D. HARTOUGH.
ALVIN I. KOSAK.

REFERENCES CITED

The following references are of record in the file of this patent:

UNITED STATES PATENTS

| Number | Name | Date |
|---|---|---|
| 1,920,246 | Daudt | Aug. 1, 1933 |
| 2,101,560 | Ralston | Dec. 7, 1937 |
| 2,432,991 | Hartough | Dec. 23, 1947 |

OTHER REFERENCES

Alles: J. Pharm. Exp. Ther., 72, 265 (1941).
Ann., 424, 1 (1921).
Richter: "Organic Chemistry," 649-50, Wiley, N. Y., 1938.
Karrer: "Organic Chemistry," 198, Nordeman, N. Y., 1938.
Calloway: Chem., rev., 17, 376 and 377 (1935).
Fieser and Fieser: "Organic Chemistry," page 536; Heath & Co., Boston, Mass., 1944.